United States Patent [19]
Funk et al.

[11] 3,807,986
[45] Apr. 30, 1974

[54] COMBINATION IRON AND IRON OXIDE BRIQUETTE AND METHOD OF USING

[75] Inventors: William H. Funk, Glenmoore; Harold B. Jensen, Downingtown; Ralph M. Smailer, West Chester, all of Pa.

[73] Assignee: Lukens Steel Company, Coatesville, Pa.

[22] Filed: June 9, 1971

[21] Appl. No.: 151,232

[52] U.S. Cl............................ 75/11, 75/44, 29/191.2
[51] Int. Cl............................................... C21c 5/52
[58] Field of Search .............. 75/10, 11, 44 R, 44 S, 75/3; 29/191.2, 192

[56] References Cited
UNITED STATES PATENTS
| | | | |
|---|---|---|---|
| 2,470,010 | 5/1949 | Williams | 75/12 |
| 2,382,534 | 8/1945 | Baily | 75/12 |

FOREIGN PATENTS OR APPLICATIONS
| | | | |
|---|---|---|---|
| 1,100,684 | 1/1968 | Great Britain | 75/44 R |

Primary Examiner—L. Dewayne Rutledge
Assistant Examiner—M. J. Andrews
Attorney, Agent, or Firm—Mason, Mason & Albright

[57] ABSTRACT

Briquettes, or uniformly sized pieces, formulated according to planned chemical and physical consistencies, introduced by gravity through the slag layer onto, or into, the molten metal bath of an electric arc furnace, during the process of steel making, for refining the metal to a desired steel composition, while making appreciable useful additions to the molten metal bath, by controlling the thermal balance and carbon content of the molten bath, and also shielding, at least in part, the refractory wall of the furnace by causing a vigorous boiling action, with erupting slag plumes, which intervene between the arcs and the refractory wall. The briquette formulations are 80–92 percent metallic iron and at least 8 percent iron oxide. The metallic iron may be particulate scrap such as borings, turnings, small chips, or similar material. The iron oxide may be mill scale, beneficiated iron ore, or similar material. Other components will be carbon at about 0.30- -2.0 percent, sulfur preferably below 0.06 percent, silica preferably less than 2.0 percent, and alumina, calcium and manganese oxides, etc. The total impurities or gangue preferably should be less than 4.0 percent. The effective density of the briquettes should be about 5.5 grams per cubic centimeter and the mass of an individual briquette should be about 50 grams minimum.

The refining is effected by combined control of the rate of introducing, and the time duration of such introduction, of briquettes to the molten metal bath, and the rate of introduction of heat into the molten metal bath by electric energy through carbon electrodes, or by other supplementary means.

30 Claims, 8 Drawing Figures

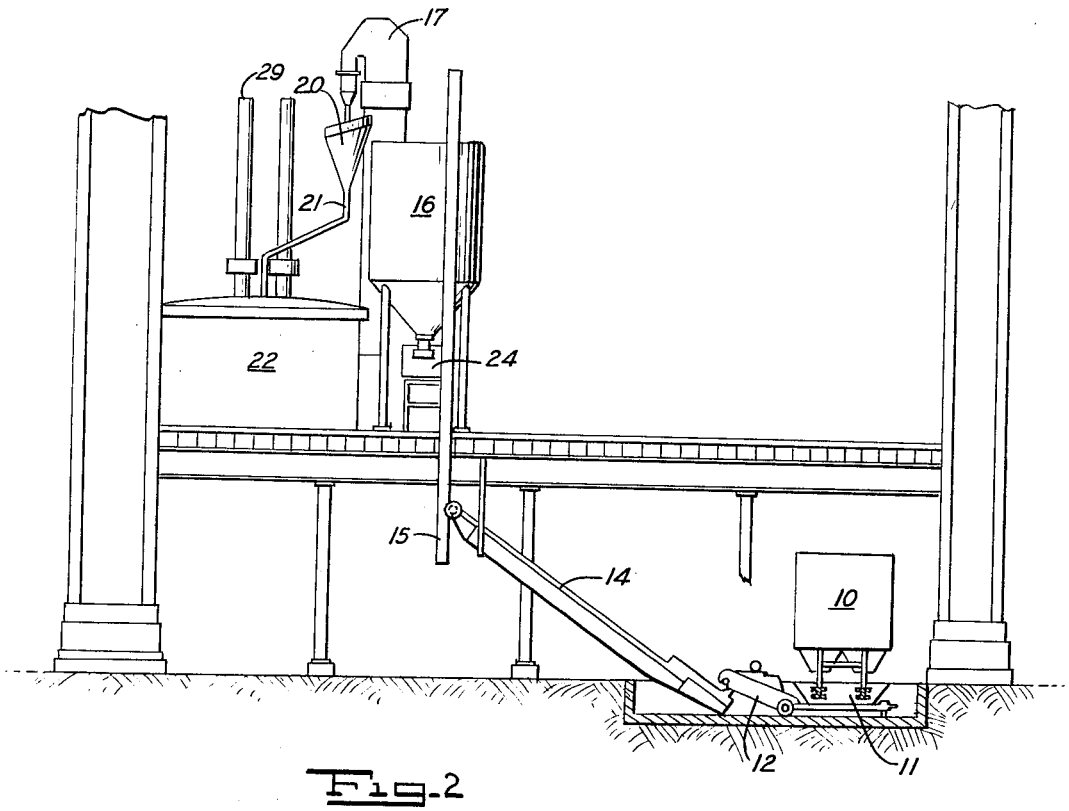
Fig.2
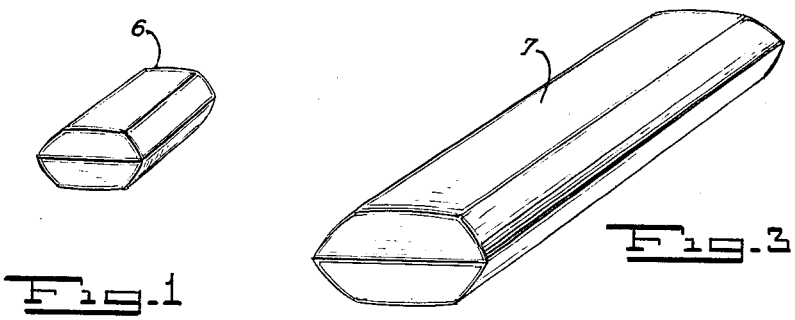
Fig.1
Fig.3
INVENTORS
WILLIAM H. FUNK
HAROLD B. JENSEN
RALPH M. SMAILER
BY
Mason, Mason & Albright
ATTORNEYS

COMBINATION IRON AND IRON OXIDE BRIQUETTE AND METHOD OF USING

BACKGROUND OF THE INVENTION

This invention relates to certain changes in the steelmaking process in electric arc furnaces. These changes improve both the productivity and economy of the steelmaking by the time and manner in which additions of an iron bearing material are made to the furnace. More particularly, we refer to the use, as will be prescribed, of a material which is made from particulate metallic iron and from iron oxide according to prescribed percentages of each.

Customarily, the electric furnace steelmaking process is based on the use of a cold metal to melt and refine. This solid charge, in large modern types of furnace, is usually dropped in batches or charges into the furnace through the top, after the roof has been moved aside to provide access. As soon as the first charge is placed in the furnace and the roof is returned to position on top of the furnace, melting of the charge commences. The melting is continued with several interruptions for further charges as the metal is melted down to create a molten bath. These charges may be any type of iron bearing material and the most preferred types are of known, uniform chemical composition, free of non-metallics which form slag upon melting, free of non-ferrous metallic elements except carbon, and of uniform size or bundle. The preferred types of charge material are usually most expensive and customarily a compromise is reached between quality and cost of the charge actually used. In addition to the iron metallic charge, other materials such as coke, lime fluorspar, etc. are added to the furnace in planned quantities during one of the major charging times. When all charge materials are melted, with a molten slag layer over the molten metal bath, refining into a steel of desired specifications is undertaken and non-metallics are absorbed into the slag, carbon level is adjusted up or down, as required, by one or more widely used methods, alloy additions are made as necessary, and a desired bath temperature is created for tapping. The molten bath or heat of steel is tapped from the furnace and the slag is also tapped with the steel so that the furnace chamber is empty. Standard reparation, called fettling, procedures are applied to restore the furnace bottom, the banks, walls, roof, doors and tap hole, as well as the electrodes, to a condition satisfactory to start another heat making cycle in the furnace. The period of time required for fettling depends upon the damage sustained by the furnace in the prior heat.

The economy, or efficiency of the steelmaking process is measured on many bases. One such is the average heat time or the productivity of the furnace. The heat time includes the entire steelmaking process, for example from the start of the initial charge of one heat to the start of charging for the next heat. However, productivity alone is not the only factor affecting the economy of the process and must be considered in conjunction with the electric power used, the oxygen consumed, and with the cost of the materials charged into the furnace. Fettling costs, total furnace refractory life and electrode consumption rates are further important consideration for an evaluation of efficiency or economy of operation.

Improvement in efficiency or economy of the steelmaking process, with or without an increase in production rate, is a continuing objective in steelmaking. In recent years, such improvement has been sought by using prereduced iron ore, in uniform particulate size, in lieu of more conventional charge materials such as scrap steel or pig iron. Such prereduced iron ore material has been batch fed or continuously fed, or both, with different indicated comparative economies to the steelmaking process. A reason for this approach has been to get the economics of electric furnace steelmaking free of the fluctuations of cost, and frequently high cost, of satisfactory charge materials. It has been found that prereduced iron ore can be used as a charge material, substituting for scrap steel or iron or pig iron, if it is in pellet or briquette form.

There are some disadvantages which might be associated with the use of prereduced iron ore as a charge material. For example, a good grade, 55 percent iron or better, ore has a market value high enough that the total cost, including ore, pelletizing, reducing and shipping, is as high or higher than the other charge materials it might substitute for. A grade of ore that can be reduced and shipped to the site of use at costs lower than other satisfactory charge materials will have some deficiency, such as high gangue content, that will raise processing costs in the steelmaking furnace so that no overall savings is obtainable. Also, some steelmaking activities have indicated that a briquette form has some processing benefits compared with a pellet form for using prereduced iron ore but the additional cost for briquetting can offset the processing gain.

It has occurred to the inventors that the probabilities for practical improvements in economy or efficiency along present lines of prereduced iron ore use in electric arc steelmaking process are limited, and that a somewhat different approach to the problem should be considered.

SUMMARY OF THE INVENTION

Shortcomings which attend the use of prereduced iron ore in pellet or briquette form in the electric arc steelmaking process can be largely overcome by the utilization of a formulated briquette composed of readily available materials whereby a process improvement is obtainable at less cost. Thus, the inventors have discovered that the constituents of such a briquette may be particulate metallic iron units such as steel turnings, cast iron borings, small iron or steel ships, etc., and iron oxide such as mill scale or iron ore, and when they are formulated to specific ranges of chemistry and physical characteristics into a briquette and fed, either by batch or continuously, into an electric arc furnace at the right time in the cycle of steelmaking, the efficiency of that process is enhanced and this efficiency can be planned and controlled.

The constituents of the subject briquette are, and traditionally have been, at the low end of the range of costs of commercially available metallic iron units or iron oxide units, they are readily handled, easily mixed for formulation, easily briquetted, and as briquettes withstand shipping and weathering hazards without deterioration. They also can have additional different materials such as fluxes, graphite or coke fines, etc., mixed with them to produce self fluxing characteristics or still other desirable properties and effects.

The subject formulated briquette can be made to have favorable compositions and characteristics that would equal or surpass in useful effectiveness in steelmaking the obtainable composition and characteristics of pellet briquettes, or sized particles made from the most desirable of available iron ores.

Silica and other non-metallics which will form slag can be kept to a very low percent of the formulation and the power cost for melting this unwanted material is eliminated.

The metallic iron portions of the formulated briquette are provided with a substantial amount of carbon which has been found by many steelmakers to be advantageous in reacting with oxygen in the mill scale to produce a vigorous boil to and in refining. Still more carbon can be added as graphite, or coke fines, etc., to the briquette as the conditions of use may suggest or require. This boiling turbulence of the slag tends to shield the radiation from the electric arcs and protect the furnace refractories from damage and thus reduce fettling time.

The oxide portions of subject briquettes may, or may not, be completely reduced by reaction with the carbon in the same briquettes, depending upon the chemistry design of the briquettes. The important thing is that carbon level in the bath can be reduced, when this is desired, in a controlled manner by the oxide-carbon reaction, thus producing one of the essential steel refining steps. The need for supplementary oxygen is therefore reduced and the efficiency of the process is enhanced. The boil turbulence of the slag accelerates the combination of oxygen from the briquette with carbon from the metal bath and thus still further favorably affects the process efficiency.

The briquettes, when made with a density and total mass exceeding the minimum required, will, upon a free fall gravity feed, or similar feed, penetrate the slag layer and enable melting of the briquette and the carbon-oxygen reactions to occur continuously and predictably. The net thermal effect of continuous feeding of subject briquettes is predictable and controllable so that the metal bath temperature can be controlled to close tolerances and thus another refining requisite is accomplished while iron units are being fed to the furnace and melted. This is another efficiency in the steelmaking process.

These formulated briquettes are magnetic and can be handled by crane magnet. They also move and flow easily in properly designed equipment such as bucket elevators, belts, etc.

They permit fine control, according to preplanned conditions, of partially overlapping steps of iron unit additions and refining in the steelmaking process and at the same time cost less than known other materials that may be utilized for similar purposes.

Although portions of the above summary appear to apply specifically to continuous feeding of the subject formulated briquettes, it will be apparent also that they have similar effects, if batch fed, on the efficiency of the steelmaking process. The low level of non-metallics in these briquettes minimizes the need for extra electric power for melting. The oxide portion of subject briquettes reacts with carbon in the molten bath as it is growing in depth with a result that the slag cover boils over more unmelted scrap and briquettes than might otherwise occur and melting is thus more rapid.

Other adaptabilities and capabilities will appear as the description progresses, reference being had to the accompanying drawing in which:

BRIEF DESCRIPTION OF THE DRAWINGS

FIG. 1 illustrates the shape of the formulated briquette in the first trial of the invention;

FIG. 2 shows a system for unloading such briquettes in accordance with the invention and charging same into a silo for introduction by elevator and chute by gravity into an electric arc furnace;

FIG. 3, which is approximately to the same scale as FIG. 1, illustrates the briquette used in further trials of the invention in the steelmaking process.

DESCRIPTIONS OF THE PREFERRED EMBODIMENTS

Figure 4A:
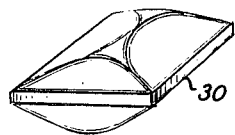
FIGS. 4A, 4B, 4C, 4D and 4E illustrate typical forms or shapes which can be used satisfactorily as briquettes, or compacted bodies, composed of the formulations of different iron containing materials described in this invention.

Many various approaches have been tried and used to adapt different materials that contain iron units to satisfactory charging practices for cold metal steelmaking processes. The compaction of particulate iron or steel scrap such as turnings, borings, chips, etc., has been practiced when process or economic conditions were favorable for doing so to dispose of such scrap materials by charging into a steelmaking furnace. Similar compaction of particulate iron oxides such as iron ore, mill scale, etc., has also been practiced under the same conditions. In the case of the iron oxide particles they may have been used as charge material without any attempt at reduction to metallic iron. However, in most recent practice it has become popular to perform such a reduction operation and this has been done before or after the compaction. The compacted product has been called a pellet, a briquette, a sized ore pebble, etc.

The chemical composition and the physical properties of the compacted product were a result of the starting material properties plus the reduction and compacting or sizing operations that could economically be applied. It was taken for granted that the steelmaker should adapt his manner of use of this product to accommodate these characteristics. Therefore it was found that no starting material produced a compacted piece that was outstanding in chemical and physical properties and in comparative economy.

We undertook the task of tabulating the various types of compacted or particulate charge materials that were available and listing the good and bad features of them. These different materials as they occurred naturally and could be subsequently processed for steelmaking use were compared with an optimum or target set of specifications and the shortcomings were evident. For some period of time we did just what others have done and attempted to compromise our specifications to fit realistic, available materials that might with renewed effort be made acceptable. At this stage it occurred to us that we were wrong in our approach. Our target set of specifications must be maintained and we could blend a mixture from the several types of iron bearing materials that were available. We found that we could formulate and produce a briquette having desirable chemical and physical properties at a cost level that could not be matched by natural occurrence or by customary benefication procedures.

A total of 31,200 pounds of formulated briquettes prepared in accordance with the invention were utilized in the first experimental trial. These briquettes were obtained from a mixture of approximately twenty tons of turnings and two tons of mill scale which were formed into pillow-shaped briquettes about 1½ inches by 1¼ inches by ⅝-¾ inch such as the briquette designated by reference numeral 6 in FIG. 1. The physical properties of such briquettes are described in Table 1 and their chemical composition as set forth in Table 2.

TABLE 1

Physical Properties of Formulated Briquettes Used in First Experimental Trial

| Color | Bulk Density, lbs/cu ft | Density, qm/cc |
|---|---|---|
| Metal to Rust | 190 | 6.05 |
| Effective Density gm/cc | | Unit Weight Ave. gm/briquette |
| 5.71 | | 80.7 |

TABLE 2

Chemical Composition of Formulated Briquettes Used in First Experimental Trial

| Total Iron | Metallic Iron | Metallization | Carbon |
|---|---|---|---|
| 93.7% | 81.4% | 86.7% | 0.03% |
| Copper | SiO₂ | | Sulfur |
| 0.06% | 0.04% | | 0.109% |

Delivery of the briquettes was accomplished by means of equipment shown schematically in FIG. 2. A hopper car 10 is brought over a track hopper 11 at grade level. A car unloader 12 transfers the formulated briquettes from track hopper 11 to an incline conveyor 14 which, in turn, feeds the briquettes into a vertical bucket elevator 15. From elevator 15, the briquettes are discharged into a storage bin 16. The briquettes should be dry when actually charged into the furnace inasmuch as excessive fumes are generated if the briquettes are wet. However, it appears that the briquettes can be stored outdoors uncovered for a reasonable period of time, but preferably should be stored in conical piles so that oxidation due to weather is confined to relatively thin surface area.

The briquettes are fed from storage bin 16 into a further bucket elevator 17 by a weigh feeder 24 at a controlled rate. Bucket elevator 17 empties into a hopper 20 which in turn empties through a movable duct 21 into the center of the electric arc furnace 22. If desired, more than one duct 21 can be used to feed the furnace 22. Three ducts similar to duct 21, spaced outside and radially in line with the electrodes 29, have been used successfully to feed pellets and briquettes into the furnace 22. Furnace 22 has a normal capacity of 150 tons. Its shell diameter is 22 feet and it is powered by a transformer rated at 56,000 kva at 55°C. rise. Secondary tap voltage settings of 540, 480, 360, 312, 251 and 208 are available. From the highest tap setting, the maximum power supplied to furnace 22 is approximately 138 megawatts. Water cooled cables carry current from the transformer to the electrode arms and 24 inch diameter premium grade solid electrodes 29 were used. Duct 21 is a single ten inch diameter feed pipe which delivers briquettes to the center of the furnace roof. Here, a 10 inch diameter roof port allowed the material to fall directly into the center of the electrode delta. A funnel (not shown) on the feed pipe attached to the furnace roof support structure permitted furnace 22 to be tilted 2° backward and forward to allow slag flushing.

An auxiliary system for lime feeding was added. This system included a bin with a capacity of about 10,000 pounds, from which lime was supplied through a screw conveyor into the base of bucket elevator 17. A variable speed reducer included in the system permitted regulation of the lime feed rate. The preferred feeding rate was 323 pounds per minute of lime.

Standard three-bucket charging practice was employed throughout the trials described herein. The first two buckets supplied about 80 percent of the scrap charge with the balance being furnished in the third bucket. The formulated briquettes made up about 10 percent of the total metallic charge.

Burnt lime in the amount of 14,000 pounds was added before the second bucket drop.

Standard shop practices were employed during the melting down of all heats described herein. Furnace 22 was powered on Tap 3 for 1 to 3 minutes until the arc bored through the scrap and a liquid pool formed. When stable arcing characteristics were established, full power was applied and melting proceeded as rapidly as possible until furnace 22 was ready for the next bucket. At full power of 38 megawatts, furnace 22 is capable of melting scrap at a rate of about 2700 pounds per minute. Powering was maintained at a maximum until quiet bath conditions were reached after scrap was pushed. A short oxygen blow was used at the end of the melt-in to stir the bath and to bring down any scrap remaining on the banks. At this stage, in accordance with standard procedure, bath temperature was measured and samples taken to determine melt-in chemistry.

Overflow of the slag from the furnace for the first few minutes of the briquette feeding was restricted by tilting it about 2° in order to gain the benefit of the additional sulfur-holding capacity of the melt-in slag.

The formulated briquettes penetrated the slag well during feeding. It was possible to begin the briquette feeding when the molten bath temperature reached 2830°F. and a bath temperature was maintained relatively constant by adjustment of the briquette feeding rate within a range of 2840° to 2880°F. A further 1000 pounds lime charge was fed into the bath with the briquette feeding.

No introduction of gaseous oxygen was required during refining in the first trial. At melt-in, the carbon was at 45 points and 17 points carbon were removed in the reaction of the molten bath to the formulated briquettes. Thus, the carbon points reduced per 1000 pounds of briquette feed was 0.448. Only one heat was made with the briquettes described in Tables 1 and 2. From experience with these briquettes, it was concluded that the average carbon content in the briquettes should be above 0.30 percent to cause a vigorous boil in the molten metal. However, the experiment proved that briquettes could be made with scrap borings, turnings and the like which are capable of being handled and fed through the molten slag into the molten bath. Since the cost of briquetting decreases as the size increases, and larger particulate scrap pieces can be included in larger briquettes, in further trials, the size of the briquettes was increased.

For each of the next trials, the turnings, mill scale and borings were blended and oversized material was screened out. Approximately four hundred gallons of waste oil was mixed with each batch in an open gondola railroad car which subsequently functioned as part of the fuel used in the hot-briquetting operating used to produce the formulated briquettes.

Three lots of briquettes were made by this method and the components and proportions are shown in Table 3.

TABLE 3

| Lot | Components | Weight in lbs. | Percent |
|---|---|---|---|
| 1 | Turnings | 82,000 | 82.0 |
|   | Borings | 8,860 | 8.8 |
|   | Mill Scale | 9,200 | 9.2 |
| 2 | Turnings | 90,940 | 90.61 |
|   | Mill Scale | 9,430 | 9.39 |
| 3 | Turnings | 77,860 | 76.21 |
|   | Borings | 8,000 | 7.82 |
|   | Mill Scale | 16,300 | 15.96 |

Each of the briquettes in Lots 1, 2 and 3 above were pillow shaped and of dimensions of about 5½"×2-½"×1¼". FIG. 3 illustrates such a briquette designated by reference numeral 7, which is approximately on the same scale as briquette 6 in FIG. 1 to compare their sizes. Their color was a black to rust and the bulk density of the briquettes per cubic foot was 190 pounds. The average density of the briquettes in Lots 1, 2 and 3 was 6.07 grams per cubic centimeter. The average void space per briquette was calculated to be 0.017 cubic centimeters per gram. The effective density, which is measured by applying a very thin Kryolon (plastic) coating to the material which sealed small pores thus trapped some of the air, was 5.51 grams per cubic centimeter. This is roughly twice that of the liquid slag. The average weight for each synthetic briquette of Lots 1, 2 and 3 was 990 grams—almost a kilogram.

Table 4 shows the chemical constituents of an average briquette of Lots 1, 2 and 3.

TABLE 4

| | | Chemical Composition of Large Briquettes | | | | |
|---|---|---|---|---|---|---|
| Lot | Total Iron | Metallic Iron | Metallization | Carbon | Copper | $SiO_2$ |
| 1 | 92.8 | 81.6 | 88 | 0.498 | .137 | .559 |
| 2 | 93.7 | 81.4 | 86.7 | 0.28 | .056 | .233 |
| 3 | 90.8 | 74.6 | 82.2 | 0.521 | .096 | .318 |

Procedures followed in the trials of the briquettes in Lots 1, 2 and 3 were basically the same as heretofore described for the smaller briquettes. The large formulated briquettes caused some problem in the continuous reading of their weight at weigh feeder 24 due to the momentum at which one or several briquettes would hit the scale and also there were some blockages of the 10-inch feed pipe 21. Accordingly, it was concluded that the optimum size briquettes for the equipment used was probably in the neighborhood of 250 grams, although the larger briquettes performed satisfactorily. They penetrated the slag well during feeding.

Briquettes of Lot 1 produced a vigorous boil nearly as vigorous as that produced by blowing oxygen at the full rate of 70,000 cubic feet per hour. The slag plumes produced by the boil reached 15 to about 24 inches, more or less, over the entire furnace area and effectively shielded the refractory wall from the intense radiations of the electric arc.

The boil produced by the second lot was not as vigorous as that of the first lot and its shielding effect to protect the walls of the furnace against the radiation of the arc was substantially less than existed with the first lot. The third lot of formulated briquettes which contained about 16 percent mill scale and 8 percent borings caused the most vigorous boil and afforded the greatest protection for the walls against the arc radiation.

It was found that the rate of carbon removal was roughly proportional to the intensity of the carbon boil. The conclusion was reached that formulated briquettes should contain iron oxide of around 8 percent or greater and carbon above 0.30 percent in order to cause a vigorous carbon boil and remove carbon rapidly from the bath. The comparatively low silica content was an advantage and it was concluded that the briquettes preferably should have minimal gangue in the form of silica. It was also found important that the sulfur content of the formulated briquettes should be comparatively low, about 0.030 percent sulfur or less desired, with 0.060 percent sulfur maximum, in order to produce a predictability of final sulfur, to reduce the lime usage, to shorten the feed time, and to lower the power required for the refining. If the sulfur content of the formulated briquettes is 0.060 percent or greater, the requirement to remove sulfur is counter-productive to the generally increased efficiency of the system.

All heats made in the trials met specified analysis and rejections for melting and casting defects were slightly above 3 percent which is comparable to rejection rates for such causes in all-scrap campaigns.

The consumption of feed material for heats utilizing the formulated briquettes in Lots 1, 2 and 3 is set forth in Table 5 and the statistics concerning the carbon removed from the bath during feeding in such heats is set forth in Table 6 below.

TABLE 5

| | Consumption of Feed Material | |
|---|---|---|
| Lot | Heat No. | Amount of Feed Material in Pounds |
| 1 | C6674 | 34,900 |
| 1 | C6696 | 36,300 |
| 2 | C6842 | 29,400 |
| 3 | C7027 | 28,400 |

TABLE 6

Carbon Removed From Bath During Feeding

| Lot | Heat No. | Carbon Points at Melt-in | Oxygen Blow Min. |
|---|---|---|---|
| 1 | C6674 | 46 | 0 |
| 1 | C6696 | 67 | 9 |
| 2 | C6842 | 72 | 11 |
| 3 | C7027 | 31 | 0 |

| Points Carbon Removed by O₂ | Points Carbon Removed by Feed | Carbon Points Removed per 100 lbs. Feed |
|---|---|---|
| 0 | 25 | 0.716 |
| 13.5 | 26.5 | 0.730 |
| 16.5 | 28.5 | 0.970 |
| 0 | 19 | 0.668 |

Mill scale used in manufacturing formulated briquettes in accordance with the invention is essentially the magnetic oxide of iron, $Fe_3O_4$. A "steelmaking process" as used herein includes also processes for making steel alloys. The term "particulate steel scrap" includes cast iron borings, turnings, small chips and other scrap material of a size which enables it to be incorporated in briquettes made in accordance with the invention. All percentages are by weight unless specified otherwise.

The shape and size of the formulated briquette are important considerations, first in the manufacture of the briquettes inasmuch as the configuration of the forming rollers must be conducive to efficient receipt of the material fed thereto, and should release the pressed briquettes without difficulty. Also ultimate shape and size govern to a certain extent the coarseness of the various material which can be utilized in the mixture of materials for processing into the formulated briquettes. Next, size and shape are important from the handling standpoint which involves the formulated briquettes static and flow characteristics including their ability to be stored, loaded, delivered and metered. Finally, the size and shape of the briquettes, together with their mass, generally govern their ability to penetrate the slag upon their introduction into the furnace. In consideration of these various factors, several various shapes advantageous in the steelmaking process involved, are shown in FIGS. 4A–4E. The formulated briquettes shown in such Figures are generally on the same relative scale.

Figure 4B:
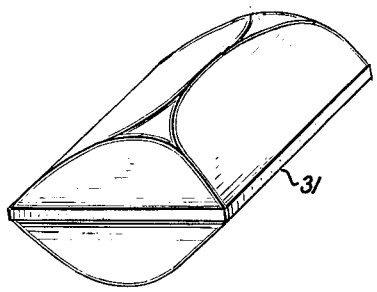

In FIG. 4A, the formulated briquette 30 is about the same weight as briquette 6, but has less depth and a greater perimeter. Such briquette is easier to press and dry. It handles well and its penetration of slag is satisfactory. Briquette 31 shown in FIG. 4B is similar in shape to briquette 30 and in mass to briquette 7. It can be handled in a satisfactory manner and has excellent slag penetration qualities.

Figure 4C:
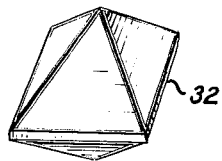

The shape of briquette 32, illustrated in FIG. 4C, is particularly conducive to the roll-press type of manufacture. It can be in various sizes and performs well both for handling purposes and in slag penetration.

Figure 4D:
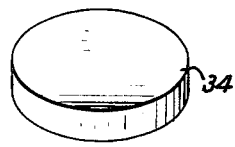
Figure 4E:
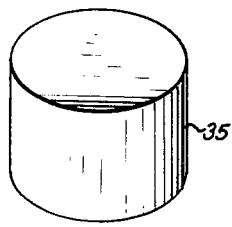

The cylindrical briquettes 34 and 35 shown in FIGS. 4D and 4E are adaptable for manufacture by roll-press or extrusion mechanisms. Briquette 34 is similar in size and shape to a hockey puck. Both cylindrical briquettes 34 and 35, meet the parameters set forth above of forming, handling, and slag penetration.

Having thus described our invention, what we claim as new and desire to secure by Letters Patent of the United States is:

1. In a steelmaking process wherein briquettes are continuously charged into an electric arc furnace at least during part of the period of refining of molten steel therein for controlling the thermal balance and carbon content of the steel bath, the improvement comprising charging briquettes containing on the average at least 80 percent particulate steel scrap and a balance of mill scale and incidental impurities and having on the average iron oxide of at least about 8 percent and carbon content of at least about 0.30 percent, said briquettes upon being received in the steel bath causing a vigorous carbon boil for removing carbon rapidly from said bath.

2. In the process of claim 1, said briquettes containing on the average not more than about 0.060 percent sulfur.

3. In the process of claim 1, said briquettes containing on the average not more than about 0.5 percent silica.

4. In the process of claim 1, said briquettes introduced into said steel bath from an opening in the upper part of said furnace by gravity through slag on the top of said steel bath, said briquettes having an effective density of about 5.5 grams per cubic centimeter.

5. In the process of claim 4 wherein the volume of said briquettes is between about 0.5 and 17.5 cubic inches.

6. A method of reducing refractory wear in an electric arc furnace during the steelmaking process due to severe heating from arc radiation, the method comprising continuously introducing formulated briquettes into the molten steel bath, said briquettes received by said bath causing a vigorous carbon boil in said bath and the erupting of slag plumes which shield the refractory of said furnace at least in part from arc radiation, said briquettes comprising on the average at least 80 percent particulate steel scrap, at least about 8 percent iron oxide, about 0.5 or more percent carbon, incidental impurities and binding material.

7. A method in accordance with claim 6 wherein the briquettes used in the method are introduced into the molten bath from an opening in the upper part of said furnace by gravity through slag on the top of the molten bath, the briquettes having an effective density of about 5.5 grams per cubic centimeter.

8. A method in accordance with claim 6 wherein the volume of the briquettes used in the method is between about 0.5 and 17.5 cubic inches.

9. A formulated briquette for use in a steelmaking process wherein a plurality of such briquettes are introduced into a molten steel bath through a layer of liquid slag on top of the bath, the briquette comprising:
   at least 50 percent particulate steel scrap,
   a minimum of about 8 percent iron oxide,
   a minimum of about 0.30 percent carbon,
   binding material, and
   incidental impurities,
the briquette having a weight in the range of about 0.05–1 kilogram and a minimum effective density of about 1½ times the density of said liquid slag.

10. A formulated briquette in accordance with claim 9 wherein the particulate steel scrap content is about 80 percent minimum.

11. A formulated briquette for use in a steelmaking process which consists essentially of at least 50 percent particulate steel scrap, a minimum of about 8 percent iron oxide substantially as mill scale, a minimum of about 0.30 percent carbon, and incidental impurities, said briquette having a minimum weight of about 80 grams and a minimum effective density of about 5.5 grams per cubic centimeter.

12. A formulated briquette for use in a steelmaking process to be introduced into a molten steel bath through a covering layer of liquid slag, the briquette essentially consisting of at least 50 percent particulate steel scrap, a minimum of about 8 percent iron oxide substantially as mill scale, a minimum of about 0.30 percent carbon, and incidental impurities, the briquette having a weight of about 0.05–1 kilogram, the minimum effective density of the briquette being about 1½ times the density of said liquid slag.

13. A formulated briquette for use in a steelmaking process which consists essentially of at least 50 percent particulate steel scrap, a minimum of about 8 percent iron oxide substantially as mill scale, a minimum of about 0.30 percent carbon, and incidental impurities, the weight of the briquette being about 1000 grams.

14. A formulated briquette for use in a steelmaking process wherein it is introduced into molten steel through a covering of liquid slag, which has a weight in the range of about eighty grams to a kilogram and consists essentially of at least 80 percent particulate steel scrap and a balance of iron oxide and incidental impurities, the particulate steel scrap providing heat conduction through the briquette and the oxide providing oxygen for reaction with available carbon whereby the briquette melts rapidly when charged into molten metal in the melting furnace of the steelmaking process.

15. A formulated briquette in accordance with claim 14 wherein the particulate steel scrap content is about 80 percent.

16. A formulated briquette in accordance with claim 14 wherein the effective density of the briquette is about 5.5 grams per cubic centimeter.

17. A formulated briquette in accordance with claim 14 wherein the weight of the briquette is about 1000 grams.

18. A readily meltable high density briquette for introduction into molten metal in a steelmaking process which consists essentially of 80–92 percent particulate steel scrap and a balance of iron oxide and incidental impurities, said briquette having an effective density of at least 5.5 grams per cubic centimeter.

19. A briquette in accordance with claim 18 having at least 0.30 percent carbon.

20. A briquette in accordance with claim 18 having 0.30–0.55 percent carbon.

21. A briquette in accordance with claim 18 having less than 0.55 percent silica.

22. A readily meltable high density briquette for introduction through slag into molten metal in a steelmaking process which comprises about:

|  | Percent |
|---|---|
| Particulate steel scrap | 80–92% |
| Iron Oxide | 8–20% |
| Carbon | .3–.5% |
| Silica | .55% max. |
| Incidental impurities | balance | said briquette having an effective density of about 5.5 grams per cubic centimeter and weighing 50–1000 grams.

23. A briquette in accordance with claim 22 wherein the sulfur content is not greater than 0.060 percent.

24. A briquette in accordance with claim 23 wherein the sulfur content is not greater than about 0.030 percent.

25. A briquette in accordance with claim 22 wherein the volume of the briquette is between about 1 and 20 cubic inches.

26. A briquette in accordance with claim 25 which is cylindrical in configuration with its diameter greater than its length.

27. A formulated briquette for use in a steelmaking process which has an effective density of at least about 5.5 grams per cubic centimeter and consists essentially of at least 80 percent particulate steel scrap, at least about 8 percent iron oxide, at least about 0.3 percent carbon, and incidental impurities, the particulate steel scrap providing heat conduction throughout the briquette to promote melting thereof when charged into a melting furnace during the steelmaking process.

28. A formulated briquette for use in a steelmaking process which is compacted to a minimum effective density of 5.5 grams per cubic centimeter, has a weight in the range of 50–1000 grams, and contains steel turnings which form a heat conductive web throughout the briquette which promotes melting of the briquette when it is charged into a melting furnace during the steelmaking process.

29. A briquette in accordance with claim 28 which is cylindrical in configuration.

30. A briquette in accordance with claim 28 wherein the volume of said briquette is between about 1.5 and 17.5 cubic inches.

* * * * *